United States Patent [19]

Schulte

[11] Patent Number: 4,822,079
[45] Date of Patent: Apr. 18, 1989

[54] GROMMET FOR WINDSHIELD WASHER HOSE

[75] Inventor: Carl W. Schulte, Grosse Pointe Woods, Mich.

[73] Assignee: General Motors Corporation, Detroit, Mich.

[21] Appl. No.: 192,053

[22] Filed: May 6, 1988

[51] Int. Cl.$^4$ ............................................. F16L 3/04
[52] U.S. Cl. ........................................ 285/162; 16/2
[58] Field of Search ................ 16/2; 248/56; 285/162, 285/196, 338; 174/152 G, 153 G

[56] References Cited

U.S. PATENT DOCUMENTS

| | | |
|---|---|---|
| 2,039,009 | 4/1936 | Lampman et al. ............... 16/2 X |
| 3,449,799 | 6/1969 | Bien . |
| 3,518,359 | 6/1970 | Trimble et al. ................. 16/2 X |
| 3,580,988 | 5/1971 | Orlowski et al. ............. 248/56 X |
| 4,301,706 | 11/1981 | Clinch et al. . |

FOREIGN PATENT DOCUMENTS

| | | | |
|---|---|---|---|
| 2410256 | 9/1975 | Fed. Rep. of Germany ........ 248/56 |
| 2812510 | 10/1979 | Fed. Rep. of Germany ........... 16/2 |

Primary Examiner—Dave W. Arola
Attorney, Agent, or Firm—Patrick M. Griffin

[57] ABSTRACT

An grommet for installing a washer hose through a windshield glass has a series of sealing ribs and a pair of flanges designed to capture any anticipated thickness of glass and to seal any anticipated diameter of a hole through the glass.

1 Claim, 1 Drawing Sheet

GROMMET FOR WINDSHIELD WASHER HOSE

This invention relates to grommets in general, and specifically to a grommet for installing a washer hose through a vehicle windshield glass.

BACKGROUND OF THE INVENTION

Windshield washer systems have some kind of fluid hose which must extend to the outside of the windshield glass. Typically, the hose just passes through the vehicle body at some point, although it is also known to pass the hose through the centerline of the windshield wiper arm post. With increasingly large front windshield glasses, it may be desired to install the hose directly through the glass itself. A logical means for doing so would be with a grommet to protect the hose from the glass and and prevent it from being withdrawn from the glass. Any passage through the glass would have to be rigorously sealed to avoid rain water leakage. A potential problem here is that the diameter of any passage bored through the glass will inevitably have a manufacturing tolerance that will cause it to vary, for any particular glass, between some anticipated minimum and maximum size. This could cause difficulty in sealing the passage. The thickness of the glass will also vary with its own manufacturing tolerance between some anticipated maximum and minimum.

SUMMARY OF THE INVENTION

The invention provides a grommet for installing a washer fluid hose through such a passage in a windshield glass that will provide adequate sealing and which will hold to the glass regardless of the tolerance variations described above.

In the preferred embodiment disclosed, the grommet is integrally molded to the outside of the washer hose, although it could be a separate component through which the hose passed. The grommet is molded of a flexible and resilient plastic material, with a generally cylindrical body through which the hose extends having an outer diameter slightly less that the minimum diameter anticipated for the passage in the windshield glass. A first circular stop flange molded to one end of the grommet body is sufficiently flexible to be drawn through the passage, returning to its original shape when it has been drawn all the way through. A second and larger diameter circular stop flange is molded to the other end of the grommet body. The two stop flanges are parallel and spaced apart by the maximum anticipated thickness of the glass. Molded to the outer surface of the grommet body, between the flanges, are three parallel, compressible sealing ribs. The ribs are given an outer diameter slightly greater than the maximum diameter anticipated for the passage.

The grommet may be installed by drawing the grommet body and smaller flange through the passage by pulling on the hose, stopping when the larger stop flange engages the glass. Because of the spacing of the flanges compared to the maximum possible thickness of the glass, it is assured that the smaller flange will pass all the way through and reexpand before the larger flange hits the glass. The glass surfaces will then be bounded by the stop flanges so as to resist withdrawal of the grommet, even if each flange is not directly against the glass surface, as in the case of thinner glass. Inside the passage, the sealing ribs will be compressed against the surface of the passage to a greater or lesser degree dependent on the actual diameter of the passage, but will be assured of being compressed to some degree. The ribs are spaced apart far enough and extend above the outer surface of the grommet body far enough that they have sufficient space to compress as necessary. Therefore, sealing of the passage is assured regardless of its diameter in any particular case.

It is, therefore, an object of the invention to provide a grommet for installing a windshield washer hose through a passage in a vehicle windshield glass that will accommodate tolerances both in the thickness of the glass and in the diameter of the passage.

It is another object of the invention to provide such a grommet that has a cylindrical body with spaced stop flanges and compressible sealing ribs, with the flanges being spaced apart by at least the anticipated maximum thickness of the glass, and with the ribs being slightly larger in diameter than the anticipated maximum diameter of the passage, thereby assuring solid installation to the glass and adequate sealing of the passage regardless of the possible variations in glass thickness and passage diameter.

DESCRIPTION OF THE PREFERRED EMBODIMENT

Figure 1:
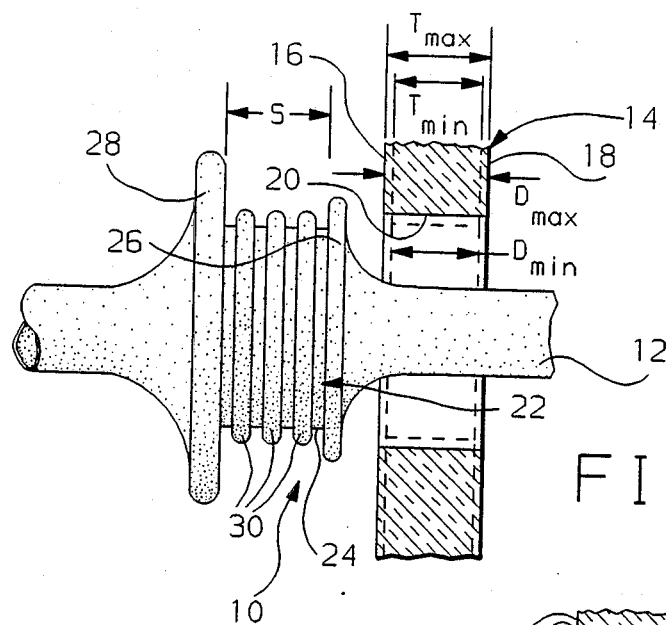
Figure 2:
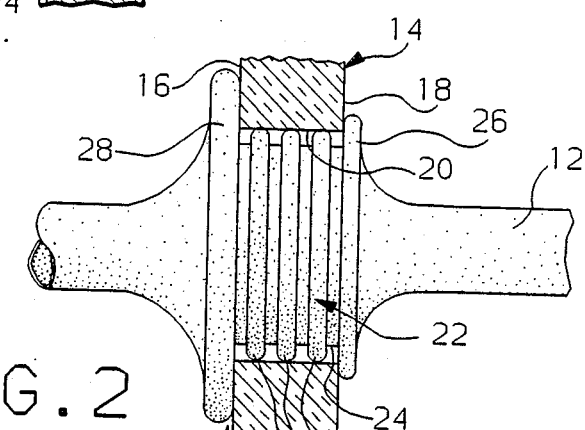
Figure 3:
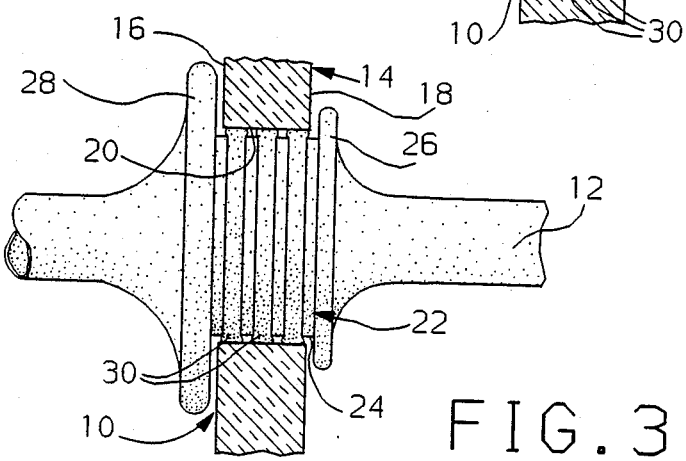

These and other objects and features of the invention will appear from the following written description, and from the drawings, in which:

FIG. 1 is a view of a windshield glass showing the possible tolerance variations in thickness and passage diameter and of a washer hose incorporating the preferred embodiment of the grommet of the invention, before its installation;

FIG. 2 a view after installation showing the condition of maximum glass thickness and passage diameter;

FIG. 3 is a view like FIG. 2, but showing the condition of minimum glass thickness and passage diameter.

Referring first to FIG. 1, a preferred embodiment of the grommet of the invention is indicated generally at 10 Grommet 10 is molded integrally to the outside of a vehicle windshield washer hose 12, although it could be a separate part through which hose 12 was passed. Hose 12 is intended to be installed by grommet 10 through a windshield glass or other similar panel indicated generally at 14. Glass 14 is generally planar, with inner and outer flat surfaces 16 and 18. Glass 14 will have an inevitable manufacturing tolerance, so that its thickness, as measured between the surfaces 16 and 18, may vary for any particular case between an anticipated minimum and maximum thickness, indicated as Tmin and Tmax. The maximum thickness is indicated in solid lines, and the minimum thickness is indicated in dotted lines for comparison. Bored though glass 14 is a cylindrical passage 20. Passage 20 will have a manufacturing tolerance as well, so that its inner diameter will vary in any particular case between an anticipated maximum, Dmax, to a minimum, Dmin. The maximum diameter is indicated in solid lines, and the minimum in dotted lines.

Grommet 14 is specially designed to accommodate the tolerances described above. Grommet 10 is molded of a tough, resilient and flexible plastic material. It has a cylindrical body 22 with an outer surface 24 that has diameter slightly less than Dmin. The outer surface of hose 12 curves up to a first circular stop flange 26 molded to the right end of the grommet body 22. First flange 26 has a diameter small enough and is flexible enough that it can be drawn through the passage 20. Hose 12 also curves up to a second and larger circular stop flange 28 molded to the opposite end of the grommet body 22. The two stop flanges 26 and 28 are generally parallel, and are spaced apart by a distance S that is at least as great as, and here substantially equal to, the maximum anticipated thickness of the glass 14, Tmax. A series of three circular and parallel spaced ribs 30 are molded integrally to the grommet body outer surface 24, between the flanges 26 and 28. Being molded of the same material as grommet body 22, ribs 30 are resilient and compressible. Ribs 30 have a generally rounded outer surface, and are given an outer diameter that is slightly greater than Dmax, for a reason described below.

Referring next to FIGS. 1 and 2, to install hose grommet 10, hose 12 is fed through passage 20 from inside and pulled to the right from the FIG. 1 to the FIG. 2 position. The smaller flange 26 will flex inwardly and pass through the passage 20 until it exits on the other side, popping back to its original shape, as shown in FIG. 2. The relation of S to Tmax assures that smaller flange 26 will make it all the way through passage 20. Then, the flange 26 will face the glass surface 18. For the particular case shown, flange 26 will contact surface 18, and flange 28 will contact surface 16, since the glass 14 is at Tmax. The capture of glass 14 between the flanges 26 and 28 provides sufficient resistance to prevent hose 12 from being withdrawn, and the grommet body 22 protects hose 12 from the edges of passage 20. It is also necessary that passage 20 be sealed. As shown, ribs 30 are compressed slightly against the inner diameter of passage 20, sealing it from the outside penetration of water.

Comparing next FIGS. 2 and 3, for the FIG. 2 case, with passage 20 at Dmax, the ribs 30 will be compressed the least. However, it is assured that they will be compressed to some degree, providing an adequate seal. For the FIG. 3 case, grommet 10 is installed in exactly the same way, but both of the flanges 26 and 28 will not contact the glass 14. As shown, neither is in contact, although at least one could be. There will still be resistance to withdrawal, should hose 12 be pulled in either direction, because either flange 28 will hit glass surface 16, or flange 26 will hit surface 18. Passage 20 will be even more tightly sealed, as the ribs 30 will be compressed to the greatest degree. Since grommet body surface 24 is smaller than Dmin, and the ribs 30 are spaced apart, they have enough crush room to accommodate the minimum diameter case. Of course, any combination of glass thickness and passage diameter may occur, FIG. 2 and showing only two possible extremes. However, with the grommet 10 configured as described, there will be adequate withdrawal resistance and sealing for any possible anticipated case or combination.

Variations of the preferred embodiment may be made. As already mentioned, grommet 10 could be molded as a separate piece through which hose 12 extended, although it makes for a much easier installation to have an integral molding. The various ribs 30 and flanges 26 and 28, as seen relative to any plane through the centerline of hose 12, have no undercuts. Therefore, it would be possible to lay a hose 12 in a mold, and mold grommet 10 coaxially to hose 12 with a single pair of die halves that parted along a plane through the centerline of hose 12. Conceivably, ribs 30 would not have to be molded integrally to the grommet body 22, but could be provided by a series of O-rings fitted over the grommet body outer surface 24. This would give the option of making grommet body 22 out of a harder material than ribs 30. Likewise, ribs 30 could be fewer in number, so long as there was at least one. Multiple ribs provide better assurance of sealing, however. The flanges 26 and 28 could be made the same size to allow pop in installation from either direction. It is most likely that withdrawal forces would be applied from the outside, however, so it would be an advantage to have a larger flange, like the flange 28 on, against the inside glass surface 18. Therefore, it will be understood that it is not intended to limit the invention to just the embodiment disclosed.

The embodiments of the invention in which an exclusive property or privilege is claimed are defined as follows:

1. For use in conjunction with an automotive panel having a thickness measured between its two surfaces that may vary between a maximum and a minimum thickness, said panel also having a generally cylindrical passage therethrough that may vary between a maximum and a minimum diameter, a washer hose and a grommet body for installing said washer hose through said passage while sealing said passage, said grommet body comprising, a generally cylindrical body molded coaxially to said hose with an outer surface having a diameter less than the minimum diameter of said passage, a first stop flange having a diameter greater than said maximum diameter of said passage at one end of said body molded of a flexible material and sufficiently small and flexible to be drawn through said passage, a second stop flange having a diameter at least as great as that of said first stop flange at the other end of said body substantially parallel to the first stop flange and spaced therefrom by at least said maximum thickness, and at least one compressible rib molded to the outer surface of said body and having an outer diameter greater than said maximum diameter, whereby, said grommet body and hose can be installed by drawing said grommet body and first stop flange through said passage for any possible thickness of panel between said minimum and maximum thickness, with said first and second flanges thereafter facing said panel surfaces to prevent said grommet body from being withdrawn, and with said rib compressed against said passage for any passage diameter between said minimum and maximum diameter to seal said passage.

* * * * *